(12) United States Patent
Ozmen et al.

(10) Patent No.: US 12,231,568 B2
(45) Date of Patent: Feb. 18, 2025

(54) ALGEBRAIC PROOF-OF-WORK ALGORITHM FOR BLOCKCHAINS

(71) Applicant: University of South Florida, Tampa, FL (US)

(72) Inventors: Muslum Ozgur Ozmen, Tampa, FL (US); Rouzbeh Behnia, Tampa, FL (US); Attila Altay Yavuz, Tampa, FL (US)

(73) Assignee: University of South Florida, Tampa, FL (US)

( * ) Notice: Subject to any disclaimer, the term of this patent is extended or adjusted under 35 U.S.C. 154(b) by 939 days.

(21) Appl. No.: 17/224,374

(22) Filed: Apr. 7, 2021

(65) Prior Publication Data

US 2021/0314158 A1    Oct. 7, 2021

Related U.S. Application Data

(60) Provisional application No. 63/006,365, filed on Apr. 7, 2020.

(51) Int. Cl.
*H04L 9/32*      (2006.01)
*G06F 17/16*     (2006.01)
*H04L 9/00*      (2022.01)
*H04L 9/30*      (2006.01)

(52) U.S. Cl.
CPC .......... *H04L 9/3218* (2013.01); *G06F 17/16* (2013.01); *H04L 9/3093* (2013.01); *H04L 9/50* (2022.05)

(58) Field of Classification Search
CPC ..... H04L 9/3218; H04L 9/50; H04L 2209/56; H04L 9/3093; H04L 9/32; G06F 17/16; G06F 17/10; G06F 17/11
See application file for complete search history.

(56) References Cited

PUBLICATIONS

Merkle, Ralph; Hellman, Martin (1978). "Hiding information and signatures in trapdoor knapsacks". Information Theory, IEEE Transactions on 24 (5): 525-530. doi:10.1109/TIT.1978.1055927. (Year: 1978).*
Schneider, M. (2013). Sieving for Shortest Vectors in Ideal Lattices. In: Youssef, A., Nitaj, A., Hassanien, A.E. (eds) Progress in Cryptology—AFRICACRYPT 2013. AFRICACRYPT 2013. Lecture Notes in Computer Science, vol. 7918. Springer, Berlin, Heidelberg. https://doi.org/10.1007/978-3-642-38553-7_22 (Year: 2013).*
Buchanan, William J (2015). Knapsack Encryption. Asecuritysite.com. https://web.archive.org/web/20151203072027/http://asecuritysite.com:80/encryption/knap (Year: 2015).*

(Continued)

*Primary Examiner* — Emily E Larocque
(74) *Attorney, Agent, or Firm* — Meunier Carlin & Curfman LLC

(57) ABSTRACT

An algebraic proof-of-work algorithm is provided that can be used as part of the consensus algorithm used by cryptocurrencies such as Bitcoin. Instead of solving blocks using a hash puzzle, the present algorithm uses an algebraic puzzle such as a lattice-based puzzle based on the shortest vector problem and/or the knapsack problem. A cryptocurrency using the proposed proof-of-work algorithm has only a small quantum advantage when compared with existing proof-of-work algorithms.

10 Claims, 3 Drawing Sheets

(56) References Cited

PUBLICATIONS

Bitcoin.org. Mar. 16, 2015 [Retrieved Mar. 21, 2024]. Retrieved from the Internet <https://web.archive.org/web/20150316235519/https://bitcoin.org>. (Year: 2015).*

TobiasBora. "Example of difficult base for the lattice problems". In math.stackexchange.com [online]. Mar. 15, 2017; 14:39 [retrieved Mar. 21, 2024]. Retrieved from the Internet: <https://math.stackexchange.com/questions/2187858/example-of-difficult-base-for-the-lattice-problems>. (Year: 2017).*

Ball, M., Rosen, A., Sabin, M., Vasudevan, P.N. (2018). Proofs of Work From Worst-Case Assumptions. In: Shacham, H., Boldyreva, A. (eds) Advances in Cryptology—CRYPTO 2018. CRYPTO 2018. Lecture Notes in Computer Science(), vol. 10991. Springer, Cham. https://doi.org/10.1007/978-3-319-96884-1_26 (Year: 2018).*

Joseph, D., Ghionis, A., Ling, C., & Mintert, F. (2019). Not-so-adiabatic quantum computation for the shortest vector problem. Physical Review Research. DOI: 10.1103/PhysRevResearch.2.013361 (Year: 2019).*

S. Niksefat et al., Privacy issues in intrusion detection systems: A taxonomy, survey and future directions, Computer Science Review, 2017 (Year: 2017).*

2019. Cryptocurrencies by Market Capitalization. https://coinmarketcap.com/. (2019). Last Accessed on Mar. 25, 2019.

Divesh Aggarwal, Gavin K Brennen, Troy Lee, Miklos Santha, and Marco Tomamichel. 2017. Quantum attacks on Bitcoin, and how to protect against them. arXiv preprint arXiv:1710.10377 (2017).

Martin R. Albrecht, Léo Ducas, Gottfried Herold, Elena Kirshanova, Eamonn W. Postlethwaite, and Marc Stevens. 2019. The General Sieve Kernel and New Records in Lattice Reduction. In Advances in Cryptology—EUROCRYPT 2019, Yuval Ishai and Vincent Rijmen (Eds.). Springer International Publishing, Cham, 717-746.

Avi Asayag, Gad Cohen, Ido Grayevsky, Maya Leshkowitz, Ori Rottenstreich, Ronen Tamari, and David Yakira. 2018. Helix: A Scalable and Fair Consensus Algorithm Resistant to Ordering Manipulation. Cryptology ePrint Archive, Report 2018/863. (2018). https://eprint.iacr.org/2018/863.

Christian Badertscher, Peter Gai, Aggelos Kiayias, Alexander Russell, and Vassilis Zikas. 2018. Ouroboros Genesis: Composable Proof-of-Stake Blockchains with Dynamic Availability. In Proceedings of the 2018 ACM SIGSAC Conference on Computer and Communications Security (CCS '18). ACM, New York, NY, USA, 913-930. https://doi.org/10.1145/3243734.3243848.

Anja Becker, Jean-Sébastien Coron, and Antoine Joux. 2011. Improved Generic Algorithms for Hard Knapsacks. In Advances in Cryptology—EUROCRYPT 2011, Kenneth G. Paterson (Ed.). Springer Berlin Heidelberg, 364-385.

Anja Becker, Léo Ducas, Nicolas Gama, and Thijs Laarhoven. 2016. New Directions in Nearest Neighbor Searching with Applications to Lattice Sieving. In Proceedings of the Twenty-seventh Annual ACM-SIAM Symposium on Discrete Algorithms (SODA '16). Society for Industrial and Applied Mathematics, Philadelphia, PA, USA, 10-24. http://dl.acm.org/citation.cfm?id=2884435.2884437.

Rouzbeh Behnia, Muslum Ozgur Ozmen, Attila A. Yavuz, and Mike Rosulek. 2018. TACHYON: Fast Signatures from Compact Knapsack. In Proceedings of the 2018 ACM SIGSAC Conference on Computer and Communications Security (CCS '18). ACM, New York, NY, USA, 1855-1867. https://doi.org/10.1145/3243734.3243819.

Alex Biryukov and Dmitry Khovratovich. 2017. Equihash: Asymmetric proof-of-work based on the generalized birthday problem. Ledger 2 (2017), 1-30.

Johannes Buchmann, Richard Lindner, and Markus Rückert. 2008. Explicit Hard Instances of the Shortest Vector Problem. In Post-Quantum Cryptography, Johannes Buchmann and Jintai Ding (Eds.). Springer Berlin Heidelberg, 79-94.

Brad Chase and Ethan MacBrough. 2018. Analysis of the XRP Ledger Consensus Protocol. CoRR abs/1802.07242 (2018). arXiv:1802.07242 http://arxiv.org/abs/1802.07242.

Lin Chen, Lei Xu, Nolan Shah, Zhimin Gao, Yang Lu, and Weidong Shi. 2017. On Security Analysis of Proof-of-Elapsed-Time (PoET). In Stabilization, Safety, and Security of Distributed Systems, Paul Spirakis and Philippas Tsigas (Eds.). Springer International Publishing, Cham, 282-297.

Matthijs J. Coster, Antoine Joux, Brian A. LaMacchia, Andrew M. Odlyzko, Claus-Peter Schnorr, and Jacques Stern. 1992. Improved low-density subset sum algorithms. computational complexity 2, 2 (Jun. 1, 1992), 111-128. https://doi.org/10.1007/BF01201999.

Phil Daian, Rafael Pass, and Elaine Shi. 2016. Snow White: Provably Secure Proofs of Stake. Cryptology ePrint Archive, Report 2016/919. (2016). https://eprint.iacr.org/2016/919.

Jintai Ding. 2019. A New Proof of Work for Blockchain Based on Random Multivariate Quadratic Equations. In Applied Cryptography and Network Security Workshops, Jianying Zhou, Robert Deng, Zhou Li, Suryadipta Majumdar, Weizhi Meng, Lingyu Wang, and Kehuan Zhang (Eds.). Springer International Publishing, Cham, 97-107.

Léo Ducas. 2018. Shortest Vector from Lattice Sieving: A Few Dimensions for Free. In Advances in Cryptology—EUROCRYPT 2018, Jesper Buus Nielsen and Vincent Rijmen (Eds.). Springer International Publishing, Cham, 125-145.

Leo Ducas, Eike Kiltz, Tancrede Lepoint, Vadim Lyubashevsky, Peter Schwabe, Gregor Seiler, and Damien Stehle. 2018. CRYSTALSDilithium: A Lattice-Based Digital Signature Scheme. IACR Transactions on Cryptographic Hardware and Embedded Systems 2018, 1 (Feb. 2018), 238-268. https://doi.org/10.13154/tches.v2018.i1.238-268.

P. Dunphy and F. A. P. Petitcolas. 2018. A First Look at Identity Management Schemes on the Blockchain. IEEE Security Privacy 16, 4 (Jul. 2018), 20-29. https://doi.org/10.1109/MSP.2018.3111247.

Pierre-Alain Fouque, Jeffrey Hoffstein, Paul Kirchner, Vadim Lyubashevsky, Thomas Pornin, Thomas Prest, Thomas Ricosset, Gregor Seiler, William Whyte, and Zhenfei Zhang. 2018. Falcon: Fast-Fourier lattice-based compact signatures over NTRU. (2018).

Nicolas Gama, Phong Q. Nguyen, and Oded Regev. 2010. Lattice Enumeration Using Extreme Pruning. In Advances in Cryptology—EUROCRYPT 2010, Henri Gilbert (Ed.). Springer Berlin Heidelberg, 257-278.

Arthur Gervais, Ghassan O. Karame, Karl Wüst, Vasileios Glykantzis, Hubert Ritzdorf, and Srdjan Capkun. 2016. On the Security and Performance of Proof of Work Blockchains. In Proceedings of the 2016 ACM SIGSAC Conference on Computer and Communications Security (CCS '16). ACM, New York, NY, USA, 3-16. https://doi.org/10.1145/2976749.2978341.

Yossi Gilad, Rotem Hemo, Silvio Micali, Georgios Vlachos, and Nickolai Zeldovich. 2017. Algorand: Scaling Byzantine Agreements for Cryptocurrencies. In Proceedings of the 26th Symposium on Operating Systems Principles (SOSP '17). ACM, New York, NY, USA, 51-68. https://doi.org/10.1145/3132747.3132757.

Lov K. Grover. 1996. A Fast Quantum Mechanical Algorithm for Database Search. In Proceedings of the Twenty-eighth Annual ACM Symposium on Theory of Computing (STOC '96). ACM, New York, NY, USA, 212-219. https://doi.org/10.1145/237814.237866.

Marcella Hastings, Nadia Heninger, and EricWustrow. 2018. The Proof is in the Pudding: Proofs of Work for Solving Discrete Logarithms. Cryptology ePrint Archive, Report 2018/939. (2018). https://eprint.iacr.org/2018/939.

Jeffrey Hoffstein, Jill Pipher, and J.H. Silverman. 2008. An Introduction to Mathematical Cryptography (1 ed.). Springer Publishing Company, Incorporated. Book summary.

Ori Jacobovitz. 2016. Blockchain for identity management. The Lynne and William Frankel Center for Computer Science Department of Computer Science. Ben-Gurion University, Beer Sheva (2016).

Aggelos Kiayias, Alexander Russell, Bernardo David, and Roman Oliynykov. 2017. Ouroboros: A Provably Secure Proof-of-Stake Blockchain Protocol. In Advances in Cryptology—CRYPTO 2017, Jonathan Katz and Hovav Shacham (Eds.). Springer International Publishing, Cham, 357-388.

Sunny King and Scott Nadal. 2012. Ppcoin: Peer-to-peer cryptocurrency with proof-of-stake. self-published paper, Aug. 19 (2012).

(56) References Cited

PUBLICATIONS

Po-Chun Kuo, Michael Schneider, Özgür Dagdelen, Jan Reichelt, Johannes Buchmann, Chen-Mou Cheng, and Bo-Yin Yang. 2011. Extreme Enumeration on GPU and in Clouds. In Cryptographic Hardware and Embedded Systems—CHES 2011, Bart Preneel and Tsuyoshi Takagi (Eds.). Springer Berlin Heidelberg, 176-191.

Thijs Laarhoven. 2015. Search problems in cryptography. Ph.D. Dissertation. Eindhoven University of Technology.

Thijs Laarhoven and Artur Mariano. 2018. Progressive Lattice Sieving. In Post-Quantum Cryptography, Tanja Lange and Rainer Steinwandt (Eds.). Springer International Publishing, Cham, 292-311.

Daniel Larimer. 2014. Delegated proof-of-stake (dpos). (2014).

Wenting Li, Sébastien Andreina, Jens-Matthias Bohli, and Ghassan Karame. 2017. Securing Proof-of-Stake Blockchain Protocols. In Data Privacy Management, Cryptocurrencies and Blockchain Technology, Joaquin Garcia-Alfaro, Guillermo Navarro-Arribas, Hannes Hartenstein, and Jordi Herrera-Joancomartí (Eds.). Springer International Publishing, Cham, 297-315.

Steve Mansfield-Devine. 2017. Beyond Bitcoin: using blockchain technology to provide assurance in the commercial world. Computer Fraud & Security 2017, 5 (2017), 14-18. http://www.sciencedirect.com/science/article/pii/S1361372317300428.

Satoshi Nakamoto. 2008. Bitcoin: A peer-to-peer electronic cash system. https://bitcoin.org/bitcoin.pdf. (2008).

NIST. 2019. PQC Standardization Process: Second Round Candidate Announcement. https://csrc.nist.gov/News/2019/pqc-standardization-process-2nd-round-candidates. (2019). Last Accessed on Nov. 17, 2019.

Committee on National Security Systems. 2015. Use of Public Standards for the Secure Sharing of Information Among National Security Systems. (2015).

C. Peikert. 2016. A Decade of Lattice Cryptography. now. https://ieeexplore.ieee.org/document/8187288.

Brandon Rodenburg and Stephen P Pappas. 2017. Blockchain and quantum computing. MITRE Technical Report (2017).

Peter W. Shor. 1999. Polynomial-Time Algorithms for Prime Factorization and Discrete Logarithms on a Quantum Computer. SIAM Rev. 41, 2 (1999), 303-332.

P. Waterland and J. P. Lomas. 2017. QRL Proof-of-Stake Algorithm. Technical Report.

Gavin Wood. 2014. Ethereum: A secure decentralised generalised transaction ledger. Ethereum project yellow paper 151 (2014), 1-32.

Z. Zheng, S. Xie, H. Dai, X. Chen, and H. Wang. 2017. An Overview of Blockchain Technology: Architecture, Consensus, and Future Trends. In 2017 IEEE International Congress on Big Data (BigData Congress). 557-564. https://doi.org/10.1109/BigDataCongress.2017.85.

* cited by examiner

ALGEBRAIC PROOF-OF-WORK ALGORITHM FOR BLOCKCHAINS

CROSS-REFERENCE TO RELATED APPLICATIONS

This application claims priority to U.S. Provisional Patent Application Ser. No. 63/006,365, filed on Apr. 7, 2020. The contents of which are hereby incorporated by reference in their entirety.

BACKGROUND

Blockchains serve as a distributed infrastructure for applications such as financial transactions, event recording, and identity management. Especially, cryptocurrencies (e.g., Bitcoin and Ethereum) have received significant attention with a total market capitalization of around 150 Billion US dollars. The trust in blockchains mainly relies on the consensus protocols, which allow that all nodes in the blockchain agree on the state of the distributed ledger. However, it is a critical yet challenging task to provide consensus on the distributed ledger, especially with the advent of quantum computers.

Polynomial-time quantum algorithms that can solve factoring and discrete logarithm problems have been proposed, rendering the traditional public-key cryptography insecure. The NSA has already issued an advisory that they anticipate a need to shift to quantum-resistant cryptography in the near future, and in this directions, NIST has initiated the second-round of standardizations for post-quantum cryptography.

Quantum computers also undermine the security of blockchains. Specifically: (i) the digital signatures currently deployed in major blockchains will be completely broken; and (ii) The consensus algorithms used in blockchains will be affected. The cryptocurrencies relying on traditional cryptographic primitives (e.g., Algorand and Ouroboros) will be insecure, whereas the hash-based ones will also become vulnerable due to the quadratic quantum advantage using Grover's algorithm.

Accordingly, there is a significant need of a proof-of work ("PoW") scheme with the following properties: (i) A PoW that has a "minimal quantum advantage", wherein the advantage of quantum computer does not grow significantly over a classical computer; (ii) The new PoW should be hard to solve but easy to verify; and (iii) The parameters of the PoW should be fine-tunable to easily adjust its difficulty.

SUMMARY

An algebraic PoW algorithm is provided that can be used as part of the consensus algorithm used by cryptocurrencies such as Bitcoin. Instead of solving blocks using a hash puzzle, the present embodiment uses an algebraic puzzle such as a lattice-based puzzle based on the shortest vector problem and/or the knapsack problem. Generally, lattice sieving algorithms that solve the shortest vector problem can be run in $2^{0.292n}$ on conventional computers and $2^{0.265n}$ on quantum computers. Accordingly, a cryptocurrency using the proposed PoW algorithm should have only a small quantum advantage when compared with existing PoW algorithms.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
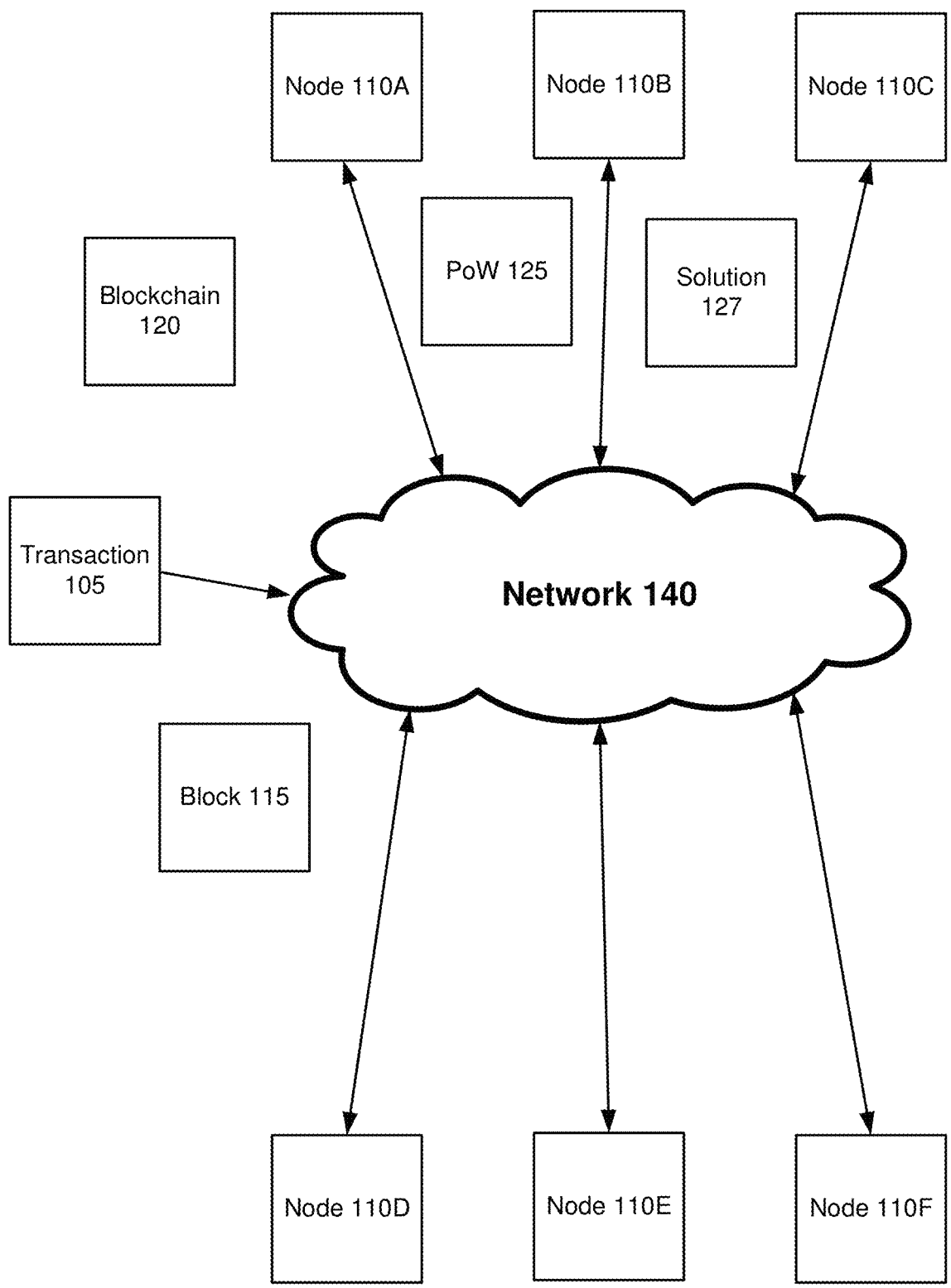
FIG. 1. Is an illustration of an example environment for performing bitcoin transactions using an algebraic PoW algorithm.

The PoW algorithm is the most common consensus algorithm and is adopted by over 90% of the blockchain-based cryptocurrencies (including Bitcoin). In the PoW algorithm, miners must prove some computational work, mostly via cryptographic hash functions. Specifically, each miner repeatedly computes the hash of the block header, which contains a nonce. Different nonces are tried until a target value (e.g., hash output starting with 18 zeros) is reached. The miner who reaches this target value then broadcasts the block (including the nonce) to other miners. The other miners then verify if indeed this block reaches the target value, and if so, the other miners add the block to their blockchains. In this way, the consensus over the distributed ledger is maintained.

The major drawback of PoW algorithms is their energy inefficiency due to the exorbitant energy consumption (gigawatts for Bitcoin) of the mining process. Although some prominent protocols have been proposed to mitigate this drawback, PoW is still the most common consensus algorithm.

To solve the drawbacks associated with PoW with respect to quantum computers, a quantum-resistant consensus algorithm for next generation blockchains is disclosed. Grover's algorithm suggests that quantum computers can perform exhaustive search quadratically faster than classical a computer, which causes the quantum vulnerability of hash based PoW. Accordingly, the quantum consensus algorithm described herein uses an algorithm with algebraic properties rather than search-based properties.

One example of an algorithm with algebraic properties is a lattice sieving algorithm. Generally, the fastest lattice sieving algorithms run in similar times on quantum computers and classical ones. Therefore, a PoW algorithm that is solved by lattice sieving algorithms would offer minimal quantum advantage to quantum computers.

Lattice sieving algorithms are mainly used to solve the shortest vector problem (SVP) that forms the basis of many lattice-based cryptographic constructions. Accordingly, a PoW that is based on SVP may provide minimum quantum advantage and adjustable difficulty requirements. Moreover, a subset of knapsack problems can be solved in polynomial time with an oracle solving SVP. The advantages of SVP-based and Knapsack-based PoW algorithms are described further below.

Before describing the SVP and knapsack-based PoW algorithms, the standard lattice-based cryptographic notation is described.

Definition 1.1. An n-dimensional lattice $\mathcal{L}$ is a discrete additive subgroup of $\mathbb{R}^n$.

Definition 1.2. Basis (B={$b_1, b_1 \ldots b_n$}) of a lattice $\mathcal{L}$ consists of a set of linearly independent vectors that generate the lattice with their linear combinations.

$$\mathcal{L} = \mathcal{L}(B) := \left\{ \sum_{i=1}^{n} z_i b_i : z_i \in \mathbb{Z} \right\} \quad (1)$$

Definition 1.3. The minimum distance ($\lambda_i(\mathcal{L})$) of a lattice $\mathcal{L}$ is defined as:

$$\lambda_1(\mathcal{L}) := \min_{v \in \mathcal{L}\setminus\{0\}} \|v\| := \min_{\text{distant } x,y \in \mathcal{L}} \|x - y\| \quad (2)$$

Definition 1.4. Given a lattice basis B, the shortest vector problem (SVP) asks to find a nonzero $v \in \mathcal{L}$ such that:

$$\|v\| = \lambda_1(\mathcal{L}) \quad (3)$$

Definition 1.5. The knapsack problem is defined as follows. Given a list of n positive integers ($a_1, a_1 \ldots a_n$) and another positive integer S, the knapsack problem asks to find a vector $\epsilon$ with elements $\epsilon_i \in \{0,1\}$ such that:

$$S = \sum_{i=1}^{n} \epsilon_i a_i \quad (4)$$

Given the above, in one embodiment, an SVP-based PoW is created. Because the fastest lattice sieving algorithms run in $2^{0.292}n$ on conventional computers and $2^{0.265}n$ on quantum computers, a PoW based on SVP is expected to minimize the quantum advantage with a significant improvement over the hash based PoWs that have a quadratic advantage. Lattice sieving algorithms are also probabilistic, therefore, the highest computation powered algorithm does not necessarily compute first.

In some embodiments, a preliminary SVP-puzzle may be created by hashing a mining block into a lattice basis B, and then solving the SVP for it. Because the difficulty of solving can be increased or decreased by adjusting the dimension n of the lattice, the adjustable difficulty requirement of the PoW is met.

However, verifying the SVP-based PoW may be more difficult than conventional hash-based PoW, because the minimum distance of the lattice may not be known. To correct this, Gaussian heuristics may be used to offer a tight bound on the norm of the shortest vector as $$1.05 \times \frac{\Gamma(n/2 + 1)^{1/n}}{\sqrt{\pi}} \times (\det \mathcal{L})^{1/n}$$

where $\det \mathcal{L}$ is the determinant of the lattice. The slowest operation of the of the Gaussian heuristic is to take the determinant of the lattice which may take a few minutes.

To improve the speed of the verification process, a knapsack based PoW may be used. It is known that with an oracle solving the SVP problem, the knapsack problem with a density $\beta < 0.94$ can be solved with a polynomial algorithm, where the density is $$\beta = \frac{n}{\log_2 \max_i a_i}.$$

In some embodiments, the knapsack based PoW may be generated by hashing a block into S and ($a_1, a_2, \ldots, a_n$). Afterwards, each miner may attempt to solve the puzzle using the lattice sieving algorithms described above, and then running a polynomial time algorithm. Once a miner solves the problem with an answer ($E_1, E_2, \ldots, E_n$), the other miners may immediately verify the answer by checking if $$S = \sum_{i=1}^{n} \epsilon_i a_i.$$

The difficulty of the problem may be adjusted by increasing the dimension n.

Embodiments of the present invention may provide the following advantages over current methods for PoW. First, the improved PoW methods may provide higher post-quantum resiliency than current PoW systems. Although quantum resiliency of consensus algorithms might be overlooked compared to the digital signatures' insecurity with the advent of quantum computers, dominating the mining power with quantum computers can have serious consequences for a blockchain. Especially in the early stages of quantum computing, the institution/country with the most advanced quantum computers can dominate the entire mining and can cause irreversible outcomes. This possibility motivates to build PoW algorithms with minimal quantum advantage, which has not been investigated thoroughly.

The improved PoW algorithms described offer significantly higher resiliency against quantum computers compared to the existing PoW algorithms. The fastest algorithms to solve SVP are the lattice sieving algorithms, with complexities of $2^{0.292}n$ on classical computers and $2^{0.265n}$ on quantum computers, based on the current results and bounds. Therefore, the proposed new PoW algorithms can be seen as quantum resilient alternatives that can be preferred considering the quantum computing threats against consensus algorithms.

Another advantage of the present invention is leveraging wasted energy. One of the main drawbacks of PoW is the gigawatts of wasted energy simply on hash calculations. The improved PoW algorithms described herein leverage this wasted energy for the cryptanalysis of lattice-based cryptography. It is believed that the improved PoW algorithm described herein will motivate the research for new algorithms to solve the SVP (which is the underlying problem for many of the lattice-based NIST proposals) and design dedicated hardware to run these algorithms faster. The NIST has already initiated the standardization process for post-quantum cryptography that includes many lattice-based constructions. Therefore, the described PoW algorithm and the consequent cryptanalysis are expected to benefit the next generation of the standardized cryptographic schemes and lead to a better understanding of the underlying problems.

Another advantage of the present invention is fast verification and adjustable difficulty. These are the core requirements for a PoW protocol that are also satisfied by the improved PoW algorithms described herein. Specifically, both of the algorithms rely on the SVP (recall that solving knapsack also requires solving SVP), whose difficulty is related to the lattice dimension. Therefore, increasing the dimension would increase the difficulty of the PoW, which can be easily decided based on the mining power in the network. Although the verification of our SVP-based PoW takes a couple minutes, knapsack-based PoW has almost immediate verification that only requires the correctness of a knapsack function.

FIG. 1. Is an illustration of an example environment for performing bitcoin transactions using an algebraic PoW algorithm. As shown, the environment 100 includes a plurality of nodes 110 (i.e., the nodes 110A-110F) that form a peer to peer blockchain network. Each node 110 may maintain a copy of a blockchain 120.

Figure 3:
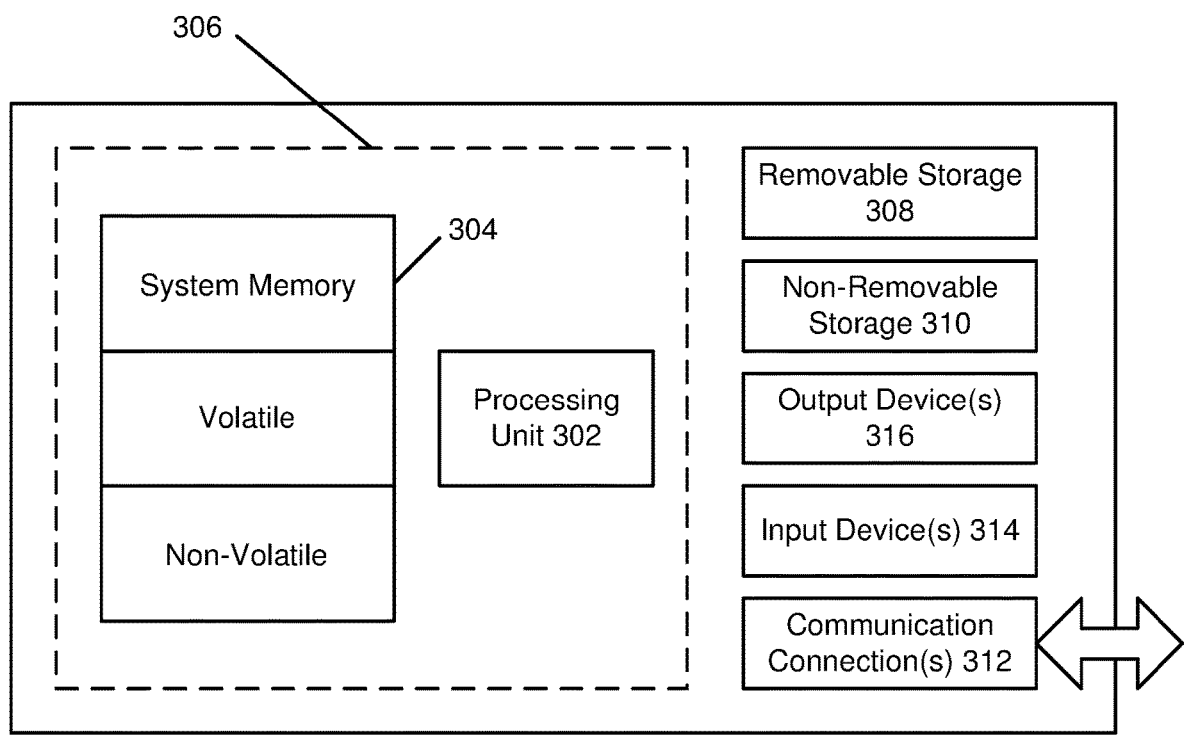
FIG. 3 shows an exemplary computing environment in which example embodiments and aspects may be implemented.

Each node 110 may be implemented by one or more general purpose computing devices such as the computing device 300 illustrated with respect to FIG. 3. The nodes 110 may communicate with each other using a network 140. While six nodes 110 are shown it is for illustrative purposes only, there is no limit to the number of nodes 110 that may be supported.

At some point in time, a transaction 105 is received for a blockchain 120. Depending on the embodiment, the transaction 105 may be a request to transfer bitcoin or other cryptocurrency to a first user from a second user. Other types of transactions 105 may be supported.

In response to the transaction 105, a block 115 representing the transaction 105 may be created. Any method for creating a block 115 for a blockchain 120 may be used. Before the block 115 can be added to the blockchain 120 it may first be verified by the nodes 110 using a process known as mining. As part of the mining process, the block 115 may be distributed to each node 110 of the blockchain network via the network 140. The block 115 may have been created by hashing a previous block of the blockchain 120 into a lattice basis B.

As part of the mining process, each node 110 may begin solving the block 115 using an algebraic PoW algorithm 125 such as a shortest vector problem algorithm or a knapsack-based algorithm.

At some point, one of the nodes 110 may solve the PoW 125 and may distribute a solution 127 to the PoW 125 and the block 115 to each of the nodes 110. For example, the node 110A may generate a solution 127 to the PoW 125 and may distribute the solution 127 and block 115 to each of the nodes 110B-110F through the network 140.

Each node 110 may receive the solution 127 and the block 115. Each node 110 may then verify that the solution 127 is correct, and if it is, the node 110 may add the block 115 to its copy of the blockchain 120.

Figure 2:
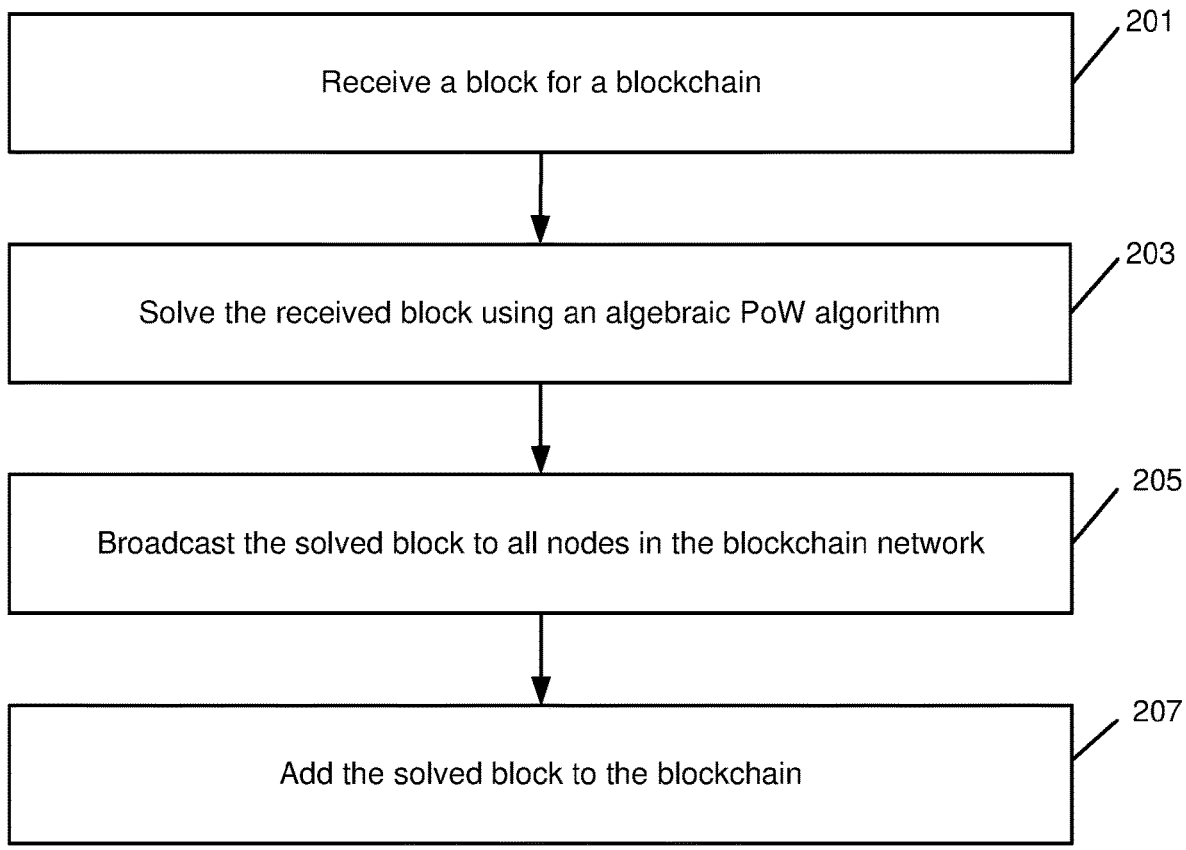
FIG. 2 is an illustration of an example method for providing an algebraic PoW algorithm.

FIG. 2 is an illustration of an example method for providing an algebraic PoW algorithm. The method 200 may be implemented by a computing device such as the computing device 200 illustrated with respect to FIG. 2.

At 201, a block is received. The block may be received by the computing device 300. The computing device 300 may be miner of a group or pool of miners working on a blockchain. As part of the mining process, each miner may have to solve a puzzle to add the new block to the blockchain. The puzzle may be an algebraic PoW. In some embodiments, the puzzle may have been created by hashing a mining block into a lattice basis B. The difficulty of the puzzle may be related to a dimension of the lattice.

At 203, the received block is solved using an algebraic PoW algorithm. The received block may be solved by the computing device 300. In some embodiments, the algebraic PoW algorithm may be a shortest vector problem algorithm. In another embodiment, the algebraic algorithm may be a knapsack-based algorithm. Other types of algebraic algorithms may be used. An advantage of algebraic PoW algorithms versus conventional hash-based PoW algorithms is that a certain class of algebraic PoW algorithms are less quantum advantaged than the hash-based PoW algorithms.

At 205, the block (and solution) are broadcast to all nodes in the blockchain network. The block may be broadcast by the computing device 300. Depending on the embodiment, each node that receives the block and solution may verify the solution by checking if $$S = \sum_{i=1}^{n} \epsilon_i a_i.$$

Other methods may be used depending on the particular algebraic PoW that was used for the block.

At 207, the solved block is added to the blockchain. The solved block may be added by the computing device 300, and by each of the nodes in the blockchain network.

FIG. 3 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing aspects described herein includes a computing device, such as computing device 300. In its most basic configuration, computing device 300 typically includes at least one processing unit 302 and memory 304. Depending on the exact configuration and type of computing device, memory 304 may be volatile (such as random access memory (RAM)), non-volatile (such as read-only memory (ROM), flash memory, etc.), or some combination of the two. This most basic configuration is illustrated in FIG. 3 by dashed line 306.

Computing device 300 may have additional features/functionality. For example, computing device 300 may include additional storage (removable and/or non-removable) including, but not limited to, magnetic or optical disks or tape. Such additional storage is illustrated in FIG. 3 by removable storage 308 and non-removable storage 310.

Computing device 300 typically includes a variety of computer readable media. Computer readable media can be any available media that can be accessed by the device 300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 304, removable storage 308, and non-removable storage 310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

Computing device 300 may contain communication connection(s) 312 that allow the device to communicate with other devices. Computing device 300 may also have input device(s) 314 such as a keyboard, mouse, pen, voice input device, touch input device, etc. Output device(s) 316 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for providing a proof-of-work for a blockchain comprising:
   receiving a cryptocurrency transaction request by a first computing device of a plurality of computing devices of a peer-to-peer blockchain network associated with the cryptocurrency; and
   in response to receiving the cryptocurrency transaction request:
      generating a block for a blockchain by the first computing device in the peer-to-peer blockchain network, wherein the block represents the cryptocurrency transaction request;
      hashing the received block into a positive integer S and a list of positive integers $(a_1, a_2, \ldots, a_n)$ to create a shortest vector problem proof-of-work (PoW) by the first computing device;
      solving the shortest vector problem PoW using a lattice sieving algorithm by the first computing device to generate a solution $(\in_1, \in_2, \ldots, \in_n)$;
      transmitting the block and the solution to each other computing device of the plurality of computing devices in the peer-to-peer blockchain network by the first computing device; and
      in response to solving the shortest vector problem PoW, adding the block to the blockchain by the first computing device.

2. The method of claim 1, wherein the lattice sieving algorithm comprises a knapsack-based algorithm.

3. The method of claim 1, wherein a difficulty of the shortest vector problem PoW may be increased by increasing a number of positive integers n in the list of positive integers.

4. The method of claim 1, further comprising:
   receiving the block and the solution $(\in_1, \in_2, \ldots, \in_n)$ by another computing device of the plurality of computing devices;
   verifying the solution $(\in_1, \in_2, \ldots, \in_n)$ by the another computing device of the plurality of computing devices by determining that $$S = \sum_{i=1}^{n} \in_i a_i,$$

wherein $\in_i$ is an $i^{th}$ integer in the solution and $a_i$ is an $i^{th}$ integer in the list of positive integers; and
   in response to verifying the solution, adding the block to the blockchain by the another computing device.

5. A computer-implemented system for providing a proof-of-work for a blockchain comprising:
   a peer-to-peer blockchain network comprising a plurality of computing devices, wherein each computing device is configured to:
      receiving a cryptocurrency transaction request by a first computing device of a plurality of computing devices of a peer-to-peer blockchain network associated with the cryptocurrency; and
      in response to receiving the cryptocurrency transaction request:
         generate a block for a blockchain;
         hash the received block into a positive integer S and a list of positive integers $(a_1, a_2, \ldots, a_n)$ to create a shortest vector problem proof-of-work (PoW);
         solve the shortest vector problem PoW using a lattice sieving algorithm to generate a solution $(\in_1, \in_2, \ldots, \in_n)$;

transmit the block and the solution to each node of the plurality of nodes in the peer-to-peer blockchain network; and in response to solving the shortest vector problem PoW, add the block to the blockchain.

6. The system of claim 5, wherein the lattice sieving algorithm comprises a knapsack-based algorithm.

7. The system of claim 5, wherein a difficulty of the shortest vector problem PoW may be increased by increasing a number of positive integers n in the list of positive integers.

8. The system of claim 5, wherein each computing device is further configured to:

receive the block and the solution $(\epsilon_1, \epsilon_2, \ldots, \epsilon_n)$ from another computing device of the plurality of computing devices;

verify the solution $(\epsilon_1, \epsilon_2, \ldots, \epsilon_n)$ by determining that $$S = \sum_{i=1}^{n} \epsilon_i a_i,$$

wherein $\epsilon_i$ is an $i^{th}$ integer in the solution and $a_i$ is an $i^{th}$ integer in the list of positive integers; and in response to verifying the solution, add the block to the blockchain.

9. A non-transitory computer readable medium storing instructions that when executed by at least one processor of a first computing device of a plurality of computing devices of a peer-to-peer blockchain associated with a cyrptocurrency cause the at least one processor to:

receive a cryptocurrency transaction request associated with the cryptocurrency; and in response to receiving the cryptocurrency transaction request:

generate a block for a blockchain;

hash the received block into a positive integer S and a list of positive integers $(a_1, a_2, \ldots, a_n)$ to create a shortest vector problem proof-of-work (PoW);

solve the shortest vector problem PoW using a lattice sieving algorithm to generate a solution $(\epsilon_1, \epsilon_2, \ldots, \epsilon_n)$;

transmit the block and the solution to each other computing device of the plurality of computing devices in the peer-to-peer blockchain network; and in response to solving the shortest vector problem PoW, add the block to the blockchain.

10. The non-transitory computer readable medium of claim 9, wherein the lattice sieving algorithm comprises a knapsack-based algorithm.

\* \* \* \* \*